United States Patent
Myers et al.

(10) Patent No.: US 12,527,735 B2
(45) Date of Patent: *Jan. 20, 2026

(54) ORAL CARE COMPOSITIONS AND METHODS

(71) Applicant: Colgate-Palmolive Company, New York, NY (US)

(72) Inventors: Carl Myers, Wayne, NJ (US); Gokul Govindaraju, Somerville, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,098

(22) Filed: Aug. 23, 2022

(65) Prior Publication Data

US 2023/0072484 A1    Mar. 9, 2023

Related U.S. Application Data

(60) Provisional application No. 63/235,918, filed on Aug. 23, 2021.

(51) Int. Cl.
*A61K 8/97* (2017.01)
*A61K 8/19* (2006.01)
(Continued)

(52) U.S. Cl.
CPC .............. *A61K 8/97* (2013.01); *A61K 8/19* (2013.01); *A61K 8/20* (2013.01); *A61K 8/21* (2013.01);
(Continued)

(58) Field of Classification Search
CPC .............. A61Q 11/00; A61K 2800/262; A61K 2800/28; A61K 2800/42; A61K 2800/92;
(Continued)

(56) References Cited

U.S. PATENT DOCUMENTS

| 3,535,421 A | 10/1970 | Briner et al. |
| 3,678,154 A | 7/1972 | Widder et al. |

(Continued)

FOREIGN PATENT DOCUMENTS

| CA | 2199027 | 3/1996 |
| CA | 2858349 | 6/2013 |

(Continued)

OTHER PUBLICATIONS

Anonymous, 2000, "Toothpaste Extension", Mintel Database GNPD AN: 10076005.

(Continued)

*Primary Examiner* — Marianne C Seidel
*Assistant Examiner* — Amanda Michelle Petritsch (57) ABSTRACT

This application relates to novel black translucent oral care compositions useful for combining and delivering incompatible stannous fluoride or stannous chloride and potassium salts in a charcoal composition, for example, to provide effective caries prevention, protection against dental erosion, and relief from dental hypersensitivity. The compositions comprise stannous fluoride or stannous chloride, nitric acid or a water-soluble nitrate salt, a water-soluble alkali metal polyphosphate and more than 10% water, by weight of the composition.

19 Claims, 3 Drawing Sheets

(51) Int. Cl.
*A61K 8/20* (2006.01)
*A61K 8/21* (2006.01)
*A61Q 11/00* (2006.01)

(52) U.S. Cl.
CPC ........ *A61Q 11/00* (2013.01); *A61K 2800/262* (2013.01); *A61K 2800/28* (2013.01); *A61K 2800/42* (2013.01); *A61K 2800/92* (2013.01)

(58) Field of Classification Search
CPC ... A61K 8/97; A61K 8/19; A61K 8/20; A61K 8/21; A61K 8/24
See application file for complete search history.

(56) References Cited

U.S. PATENT DOCUMENTS

| | | | |
|---|---|---|---|
| 4,259,316 | A | 3/1981 | Nakashima et al. |
| 4,842,847 | A | 6/1989 | Amjad |
| 4,885,155 | A | 12/1989 | Parran, Jr. et al. |
| 4,931,273 | A * | 6/1990 | Gaffar .................. A61K 8/8164 424/57 |
| 5,258,173 | A | 11/1993 | Waterfield |
| 5,352,439 | A | 10/1994 | Norfleet et al. |
| 5,578,293 | A | 11/1996 | Prencipe et al. |
| 5,693,314 | A | 12/1997 | Campbell et al. |
| 5,811,079 | A | 9/1998 | Yu et al. |
| 6,464,963 | B1 | 10/2002 | Gambogi et al. |
| 8,906,347 | B2 | 12/2014 | Strand et al. |
| 8,926,950 | B2 | 1/2015 | Heckendorn et al. |
| 9,724,278 | B2 | 8/2017 | Lambert et al. |
| 9,937,115 | B2 | 4/2018 | Haught et al. |
| 9,968,803 | B2 | 5/2018 | Fruge et al. |
| 10,285,919 | B2 | 5/2019 | Rege et al. |
| 10,653,596 | B2 | 5/2020 | Gininger |
| 10,918,580 | B2 | 2/2021 | Zhang et al. |
| 2006/0140881 | A1 | 6/2006 | Xu et al. |
| 2007/0140986 | A1 | 6/2007 | Prencipe et al. |
| 2011/0014136 | A1 | 1/2011 | Kohli et al. |
| 2011/0020247 | A1 | 1/2011 | Strand |
| 2011/0020248 | A1 | 1/2011 | Strand |
| 2017/0135936 | A1 | 5/2017 | Shanmugam et al. |
| 2017/0281486 | A1 | 10/2017 | Midha et al. |
| 2018/0177695 | A1 | 6/2018 | Miller et al. |
| 2019/0269606 | A1 | 9/2019 | Price et al. |
| 2020/0163868 | A1 * | 5/2020 | Martinetti ................ A61K 8/96 |
| 2020/0197268 | A1 | 6/2020 | Myers et al. |
| 2021/0000709 | A1 | 1/2021 | Zhang et al. |
| 2021/0137803 | A1 | 5/2021 | Zhang et al. |
| 2022/0339228 | A9 | 10/2022 | Kruse et al. |
| 2023/0072484 | A1 | 3/2023 | Myers et al. |
| 2024/0050334 | A1 * | 2/2024 | Schaeffer-Korbylo ...................... A61K 47/02 |

FOREIGN PATENT DOCUMENTS

| | | | |
|---|---|---|---|
| CN | 1418086 | 5/2003 | |
| CN | 102612356 | 7/2012 | |
| CN | 102946844 | 2/2013 | |
| CN | 103648471 | 3/2014 | |
| CN | 104069013 | 10/2014 | |
| CN | 109328092 | 2/2019 | |
| CN | 110087619 | 8/2019 | |
| CN | 116648227 | 8/2023 | |
| EP | 2374446 | 10/2011 | |
| JP | 2015221814 A | 12/2015 | |
| WO | 1995/007682 | 3/1995 | |
| WO | 2011/124659 | 10/2011 | |
| WO | 2016/178652 | 11/2016 | |
| WO | 2017/117363 | 7/2017 | |
| WO | 2020/131823 | 6/2020 | |
| WO | 2020/244822 | 12/2020 | |
| WO | 2021/002910 | 1/2021 | |
| WO | WO-2021002910 A1 * | 1/2021 | ............... A61K 8/19 |
| WO | 2022/140280 | 6/2022 | |
| WO | 2022/140281 | 6/2022 | |
| WO | 2022/140368 | 6/2022 | |

OTHER PUBLICATIONS

Anonymous, 2002, "Flouride Toothpaste for Sensitive Teeth", Mintel Database GNPD AN: 10111837.
Campbell, 1954, "A kinetic study of the hydrolysis of pyrophosphates," Journal of the American Chemical Society 76 (3):893-901.
Myers et al., 2019, "Solving the problem with stannous fluoride," Journal of the American Dental Association 150(4 Suppl.):S5-S13.
Bryan et al., 2017, "Nitrate-Reducing Oral Bacteria: Linking Oral and Systemic Health", Nitrite and Nitrate in Human Health and Disease, Humana Press pp. 21-31.
Campbell et al., 1977, "Some uses of pyrophosphates in metal finishing part II. Cobalt-tungsten alloys to zinc, including pretreatment for magnesium", Surface Technology, Elsevier, 5(3):235-254.
International Search Report and the Written Opinion of the International Searching Authority issued in International Application PCT/US2020/026844 mailed Jul. 21, 2020.
International Search Report and the Written Opinion of the International Searching Authority issued in International Application PCT/US2021/064401 mailed May 10, 2022.
International Search Report and the Written Opinion of the International Searching Authority issued in International Application PCT/US2021/064402 mailed Apr. 20, 2022.
International Search Report and the Written Opinion of the International Searching Authority issued in International Application PCT/US2021/064587 mailed Apr. 21, 2022.
International Search Report and the Written Opinion of the International Searching Authority issued in International Application PCT/US2022/041267 mailed Dec. 15, 2022.
Kapil, et al. Dietary Nitrate Provides Sustained Blood Pressure Lowering in Hypertensive Patients. Hypertension. 2015; 65: 320-327.
Vanhatalo et al., 2018, "Nitrate-responsive oral microbiome modulates nitric oxide homeostatis and blood pressure in humans", Free Radical Biology & Medicine, Elsevier, 124:21-30.
Colgate-Palmolive Company, 2022, "Gum Booster with Hyaluronic Acid Toothpaste", Mintel Database GNPD AN: 9602562.
International Search Report and the Written Opinion of the International Searching Authority issued in International Application PCT/US2024/060971 mailed Jun. 18, 2025.

* cited by examiner

ORAL CARE COMPOSITIONS AND METHODS

CROSS-REFERENCE TO RELATED APPLICATIONS

This application claims priority to, and the benefit if, U.S. Provisional Application No. 63/235,918, filed on Aug. 23, 2021, the contents of which are hereby incorporated by reference in its entirety.

BACKGROUND

This application relates to novel black translucent oral care compositions useful for combining and delivering incompatible stannous fluoride or stannous chloride and potassium salts in a charcoal composition, for example, to provide effective caries prevention, protection against dental erosion, and relief from dental hypersensitivity.

Dental plaque is a sticky biofilm or mass of bacteria that is commonly found between the teeth, along the gum line, and below the gum line margins. Dental plaque can give rise to dental caries and periodontal problems such as gingivitis and periodontitis. Dental caries tooth decay or tooth demineralization caused by acid produced from the bacterial degradation of fermentable sugar.

Oral care compositions which contain stannous ion sources exhibit excellent clinical benefits, particularly in the reduction of gingivitis. Stannous ion sources, such as stannous fluoride and stannous chloride, are well known for use in clinical dentistry with a history of therapeutic benefits over forty years. However, until recently, its popularity has been limited by its instability in aqueous solutions. The instability of stannous salts in water is primarily due to the reactivity of the stannous ion ($Sn^{2+}$). Stannous salts readily hydrolyze at a pH above 4, resulting in precipitation from solution. It has traditionally been thought that this formation of insoluble stannous salts results in a loss of therapeutic properties.

One common way to overcome the stability problems associated with stannous ions is to limit the amount of water in the composition to very low levels, or to use a dual phase system. Both of these solutions to the stannous ion problem have drawbacks. Low water oral care compositions can be difficult to formulate with desired rheological properties, and dual-phase compositions are considerably more expensive to manufacture and package. Thus, it is preferable to formulate a high-water composition which uses an alternative means to maintain stable efficacious stannous ion concentrations.

Dentinal hypersensitivity (i.e., sensitivity) is a painful condition resulting from the movement of liquid in exposed dentin tubules from external stimuli such as pressure and temperature.

Potassium nitrate has been used to treat sensitive teeth. However, this ingredient is well known to have foam breaking properties making it difficult to obtain the sensory foam profile which delivers improved consumer acceptance. In many regions of the world, consumers prefer high foaming toothpastes over products that have a poor foaming ability. Conventional levels of surfactants usually yield acceptable foam volumes when tested in pure water. However, when the testing is performed in solutions mimicking the composition of human saliva it is hard to achieve foam levels that exceed a certain volume because human saliva also has foam breaking properties.

The formulation of oral care compositions comprising stannous fluoride or stannous chloride and potassium salts together is particularly challenging because of stability issues between these two ingredients. Prior attempts to include both stannous fluoride and potassium salts, such as potassium nitrate, in a single-phase, desensitizing dental composition has been hampered by the formation of insoluble stannic salts and compounds such as $Sn(OH)_2$ and $SnO_2$. Some solutions have been to create dual-component compositions in which one component comprises the potassium salt, along with sodium hydroxide to adjust the pH of the component to 8 to 11, and the second component comprises the stannous fluoride or other stannous salts. These compositions also contain no more than 40% water. Other suggestions for formulations combining fluoride and stannous salts similarly call for very low water contents, e.g., less than 10% water.

It has also been reported that aqueous oral care compositions comprising unstabilized stannous ion and nitrate ion together may form potentially toxic species such as nitrite ion and nitrosamines, due to the reduction of the nitrate ion by the stannous ion. To avoid this issue, Campbell (U.S. Pat. No. 5,693,314) resorts to a two-component composition with the stannous ion source and the nitrate ion source in separate components. Heckendorn (U.S. Pat. No. 8,926,950) resolves this problem in a single-phase aqueous composition by strictly controlling the molar ratio of solvated nitrate ion to solvated stannous ion of less than 2:1 at a pH of 3 to 6. Strand (US 2011/0020247) resolves this problem in a single-phase composition by stabilizing the stannous ion with a chelant, such as citric acid or polyphosphates such as tripolyphosphate, in moderate water compositions (e.g., 20-65% water), A further difficulty may also be that fluoride ions in an oral care composition tend to precipitate out of solution when potassium nitrate is present, due to the low solubility of ionic fluoride sources. Though this problem has been addressed, at least in part, by using monofluorophosphate salts. Although this then precludes fluoride salts as fluoride ion sources.

While it has been generally suggested that oral care compositions comprising stannous salts, fluoride salts, and polyphosphate could be prepared, many references do not take issue with or seem to be aware of the unique formulation difficulties which may be encountered. Although some similar compositions avoid the issues by resorting to dual-component manufactures.

A recent trend that has become popular is the use of charcoal (e.g., activated charcoal) in dentifrices. Charcoal has numerous benefits, including that it can absorb from the oral cavity the products of cariogenic bacterial fermentation (including lactic and acetic acids), as well as sources of malodor, and may interfere with bacterial growth and plaque formation. Charcoal has been used in toothpaste to gain stain-fighting, anti-caries and whitening benefits. Charcoal is generally provided as a finely divided black powder.

From a marketing or aesthetic perspective, the appearance of a dentifrice is very important. In the past, toothpastes were always white and completely opaque. Over the last few decades, both transparent and colored toothpastes have become very common. Consumers are very attracted to transparent toothpastes, which are commonly made in colors such as red, green and blue. The degree of transparency can vary, but often takes considerable effort to control, as the color and transparency together can depend on many factors, including the coloring agents and their concentrations, the refractive index of the composition, the opacity of other ingredients (such as silicas and polymers), and the water content of the composition.

Current charcoal dentifrices are black or very dark brown in color and completely opaque. It has proven very difficult to formulate a dentifrice with charcoal that provides a translucent black color. Efforts at reducing the intensity of the black color to provide translucency often result instead in an opaque grey dentifrice. It would be highly desirable to provide a translucent black dentifrice, especially one that provides stable stannous, fluoride and potassium together.

BRIEF SUMMARY

The present disclosure provides single-component black translucent dentifrice compositions comprising a combination of stannous fluoride or stannous chloride, nitric acid or a soluble nitrate salt, and an alkali metal polyphosphate with charcoal. U.S. application Ser. No. 16/840,857 (now U.S. Pat. No. 10,918,580), incorporated by reference herein in its entirety, discloses the surprising discovery that a combination of stannous fluoride or stannous chloride, nitric acid or a soluble nitrate salt, and an alkali metal polyphosphate salt in high-water oral care composition results in stability of stannous, fluoride and nitrate in solution. In one aspect, the invention further provides single-component, high-water black translucent dentifrice compositions with stable stannous, fluoride and nitrate in solution.

The disclosure further provides single-component oral care composition packages comprising the compositions disclosed herein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

As is usual in the art, the compositions described herein are sometimes described in terms of their ingredients, notwithstanding that the ingredients may disassociate, associate or react in the formulation. Ions, for example, are commonly provided to a formulation in the form of a salt, which may dissolve and disassociate in aqueous solution. It is understood that the invention encompasses both the mixture of described ingredients and the product thus obtained.

In a first aspect, the present disclosure provides a black translucent single-component oral care composition (Composition 1) comprising:
  (i) stannous fluoride or stannous chloride;
  (ii) nitric acid or a water-soluble nitrate salt (e.g., potassium nitrate);
  (iii) a water-soluble alkali metal polyphosphate (e.g., sodium or potassium pyrophosphate or tripolyphosphate); and
  (iv) more than 10% water, by weight of the composition; and
  (v) 0.001 to 0.025% by weight of charcoal (e.g., activated charcoal); wherein the composition is formulated as a dentifrice (e.g., toothpaste or tooth gel).

For example, the disclosure provides embodiments of Composition 1 as follows:
  1.1 Composition 1, wherein the composition comprises 0.001 to 0.020% by weight of charcoal, e.g., 0.001 to 0.015%, or 0.001 to 0.012%, or 0.005 to 0.010%, or 0.005 to 0.009%, or 0.005 to 0.0085%, by weight of charcoal.
  1.2 Composition 1.1, wherein the composition comprises 0.005 to 0.008% or 0.006 to 0.008% by weight of charcoal.
  1.3 Composition 1.2, wherein the composition comprises 0.007 to 0.008% by weight of charcoal.
  1.4 Composition 1.3, wherein the composition comprises about 0.0075% by weight of charcoal.
  1.5 Composition 1, or any of 1.1-1.5, wherein the charcoal is activated charcoal.
  1.6 Composition 1, or any of 1.1-1.5, wherein the composition has a light transmittance of at least 0.001% measured on a 10 mm-thick vertical sample, e.g., at least 0.01%, or at least 0.1%, or at least 0.2%, or 0.05% to 1%, or 0.1% to 1%, or 0.2% to 0.5%, or about 0.25%.
  1.7 Composition 1, or any of 1.1-1.6, wherein the composition has a turbidity of less than 1000 NTU measured on a 10 mm thick sample, e.g., less than 750 NTU, or less than 600 NTU, or 300-700 NTU, or 400-600 NTU, or about 550 NTU.
  1.8 Composition 1, or any of 1.1-1.7, wherein the composition has L*a*b color values of 1-50 for L (e.g., 5 to 30 or 10 to 20), and/or −0.1 to 0.1 for a, and/or −0.25 to 0.25 for b.
  1.9 Composition 1.8, wherein the composition has L*a*b color values of about 12 for L, about 0 for a and about 0.2 for b.
  1.10 Composition 1, or any of 1.1-1.9, wherein the composition does not comprise any white pigment (e.g., does not comprise titanium dioxide).
  1.11 Composition 1, or any of 1.1-1.10, wherein the water-soluble nitrate salt is selected from an alkali or alkaline earth metal nitrate, or zinc nitrate, silver nitrate, or ammonium nitrate.

1.12 Composition 1.11, wherein the water-soluble nitrate salt is an alkali metal nitrate salt or an alkaline earth metal nitrate salt.

1.13 Composition 1.12, wherein the nitrate salt is selected from lithium nitrate, sodium nitrate, potassium nitrate, magnesium nitrate, and calcium nitrate.

1.14 Composition 1.13, wherein the nitrate salt is potassium nitrate.

1.15 Any foregoing composition, wherein the water-soluble alkali metal polyphosphate is selected from a pyrophosphate, tripolyphosphate, tetraphosphate or hexametaphosphate.

1.16 Any foregoing composition, wherein the water-soluble alkali metal polyphosphate is a sodium or potassium polyphosphate.

1.17 Any foregoing composition, wherein the water-soluble alkali metal polyphosphate is selected from sodium pyrophosphate, potassium pyrophosphate, sodium tripolyphosphate and potassium tripolyphosphate.

1.18 Composition 1.17, wherein the sodium pyrophosphate salt is selected from sodium acid pyrophosphate (i.e., disodium pyrophosphate) and tetrasodium pyrophosphate.

1.19 Any foregoing composition, wherein the water-soluble nitrate salt is potassium nitrate and the water-soluble alkali metal polyphosphate salt is tetrasodium pyrophosphate.

1.20 Any foregoing composition, wherein the composition comprises a molar ratio of alkali metal polyphosphate (e.g., tetrasodium pyrophosphate) to stannous fluoride or stannous chloride of at least 1:1, e.g., 1:1 to 5:1, or 1:1 to 4:1, or 1:1 to 3:1, or 1:1 to 2:1, or 1.5:1 to 5:1, or 2:1 to 5:1, or 2:1 to 4:1, or 2:1 to 3:1, or about 1:1.

1.21 Any foregoing composition, wherein the composition comprises a molar ratio of nitric acid or water-soluble nitrate salt (e.g., potassium nitrate) to stannous fluoride or stannous chloride of at least 0.3:1, e.g., 0.3:1 to 20:1, or 0.5:1 to 20:1, or 1:1 to 20:1, or 1:1 to 15:1, or 1:1 to 10:1, or 1:1 to 5:1 or 1:1 to 3:1, or about 1:1.

1.22 Any foregoing composition, wherein the composition comprises from 0.1 to 2% stannous fluoride or stannous chloride, by weight of the composition, e.g., 0.1 to 1%, or 0.25 to 0.75%, or about 0.45%.

1.23 Any foregoing composition, wherein the composition comprises from 0.1 to 5% of the nitric acid or water-soluble nitrate salt (e.g., potassium nitrate), by weight of the composition, e.g., 0.1 to 2%, or 0.1 to 1%, or 0.1 to 0.5%, or 0.2 to 0.4%, or 0.25 to 0.75%, about 0.3%, or about 0.5%.

1.24 Any foregoing composition, wherein the composition comprises from 0.1 to 5% of the alkali metal polyphosphate salt (e.g., tetrasodium pyrophosphate or sodium tripolyphosphate), by weight of the composition, e.g., 0.8 to 5%, or 0.8 to 4%, or 0.8 to 3%, or 0.8 to 2%, or 0.8 to 1.0%, or 1.0 to 1.5%, or about 0.8%, or about 1.2%.

1.25 Any foregoing composition, wherein the composition comprises at least 15% water by weight of the composition. e.g., at least 20%, or at least 30%.

1.26 Any foregoing composition wherein the composition comprises 10% to 50% water, by weight of the composition, e.g., from 15% to 40%, or from 20% to 40%, or from 25% to 35%, or from 75% to 80%; or wherein the composition comprises from 10% to 50% water, by weight of the composition, e.g., 10% to 40%, or 10% to 30%, or about 20%.

1.27 Any foregoing composition, wherein the composition comprises one or more humectants (e.g., glycerin, sorbitol, propylene glycol, or a mixture thereof) in a net amount of 5% to 70% by weight of the composition, e.g., from 5% to 25% by weight of the composition, or from 10% to 25%, or from 15% to 25%, or about 20%, or from 30 to 70%, or from 35 to 60%, or from 40 to 60%, or from 60 to 70%, by weight of the composition.

1.28 Any foregoing composition, wherein the composition is a single phase. i.e., it does not form two phases on standing.

1.29 Any foregoing composition, wherein the composition is dual phase. i.e., it forms two phases on standing.

1.30 Composition 1.29, wherein the composition forms an emulsion immediately upon mixing, and separates into two phases upon standing within 10 minutes (e.g., within 5 minutes, or within 3 minutes, or within 1 minute).

1.31 Any foregoing composition, wherein the composition is a clear (e.g., not opaque or turbid) solution (e.g., not a suspension) or a clear (e.g., translucent, not opaque) semisolid or gel.

1.32 Any foregoing composition, wherein the composition is physically and chemically stable, for example, wherein no color change or precipitation occurs on storage at ambient conditions for 3 months or more (e.g., 6 months or more, or 1 year or more).

1.33 Composition 1.32, wherein the stannous ion concentration is substantially stable for at least three months on storage, e.g., the concentration of stannous ion is at least 80% of the original concentration, or at least 85%, or at least 90%.

1.34 Any foregoing composition, wherein the composition has a pH of between 5 and 9, or a pH between 6 and 8, or a pH between 6.5 and 7.5, or a pH between 6.9 and 7.1, or a pH of about 7.

1.35 Any foregoing composition, further comprising a nonionic surfactant, e.g., a hydrophilic nonionic surfactant.

1.36 Composition 1.35, wherein the nonionic surfactant is a copolymer of ethylene oxide and propylene oxide, for example, a block copolymer (e.g., a triblock copolymer).

1.37 Composition 1.36, wherein the nonionic surfactant is a poloxamer, e.g., a triblock copolymer having a hydrophobic polypropylene glycol block flanked by hydrophilic polyethylene glycol blocks.

1.38 Composition 1.37, wherein the poloxamer has a polyethylene glycol block length of about 75 to 125 units (e.g., about 100-101), and a polypropylene block length of about 25 to 75 units (e.g., about 55-56), for example, poloxamer 407 or Pluronic F127.

1.39 Any foregoing composition, comprising a nonionic surfactant in an amount of 0.01 to 5.0%, by weight of the composition, e.g., 0.1 to 1.0%, 0.2 to 0.7%, 0.3 to 0.5%, about 0.4%.

1.40 Any foregoing composition, further comprising an anionic surfactant, e.g., selected from sodium laurel ether sulfate (SLES), sodium lauryl sulfate, and ammonium lauryl sulfate.

1.41 Any foregoing composition wherein the composition further comprises one or more of a thickener (e.g., xanthan gum or carboxymethyl cellulose, such as sodium salt), a buffer, a sweetener, a flavorant, a pigment, a dye, an anti-caries agent, an anti-bacterial agent, a whitening agent, a desensitizing agent, a preservative, or a mixture thereof.

1.42 Any foregoing composition wherein the composition further comprises an additional fluoride ion source.

1.43 Composition 1.42, wherein the additional fluoride ion source is selected from sodium fluoride, potassium fluoride, sodium monofluorophosphate, sodium fluorosilicate, ammonium fluorosilicate, amine fluoride (e.g., N'-octadecyltrimethylendiamine-N,N,N'-tris(2-ethanol)-dihydrofluoride), ammonium fluoride, titanium fluoride, hexafluorosulfate, or a mixture thereof.

1.44 Any foregoing composition wherein the composition comprises a whitening agent.

1.45 Any foregoing composition wherein the composition comprises a whitening agent, wherein the whitening agent is hydrogen peroxide.

1.46 Any foregoing composition wherein the composition further comprises a desensitizing agent selected from potassium chloride, strontium chloride, or a mixture thereof.

1.47 Any foregoing composition wherein the composition is a toothpaste or a tooth gel.

1.48 Any foregoing composition, wherein the composition comprises abrasive (e.g., silicas) in an amount of 1-30% by weight of the composition, e.g., 10-30%, or 20-25%, or 15-20%.

1.49 Any of the foregoing compositions, wherein the composition is effective upon application to the oral cavity, e.g., by rinsing, optionally in conjunction with brushing, to (i) reduce or inhibit formation of dental caries, (ii) reduce, repair or inhibit pre-carious lesions of the enamel, e.g., as detected by quantitative light-induced fluorescence (QLF) or electrical caries measurement (ECM), (iii) reduce or inhibit demineralization and promote remineralization of the teeth, (iv) reduce hypersensitivity of the teeth, (v) reduce or inhibit gingivitis, (vi) promote healing of sores or cuts in the mouth, (vii) reduce levels of acid producing and/or malodor producing bacteria, (viii) treat, relieve or reduce dry mouth, (ix) clean the teeth and oral cavity, (x) whiten the teeth, (xi) reduce tartar build-up, (xii) reduce or prevent oral malodor, and/or (xiii) promote systemic health, including cardiovascular health, e.g., by reducing potential for systemic infection via the oral tissues.

1.50 Any foregoing composition, wherein the composition has enhanced stannous ion stability (e.g., compared to a composition comprising stannous fluoride or stannous chloride without both a nitrate ion source and a polyphosphate).

1.51 Any foregoing composition further comprising one or more of a zwitterionic surfactant (e.g., betaine), and a nonionic polymer (e.g., a polyethylene glycol, such as PEG-600).

1.52 Any foregoing composition, wherein the composition has less than 20% by weight of any one polymeric thickener (e.g., xanthan gum, carrageenan gum, carboxymethyl cellulose, such as sodium CMC), such as less than 15% by weight, or less than 10% by weight, or less than 5% by weight, or less than 1% by weight, or 0.05-1%, or 0.05-0.5%, or 0.25 to 0.75%, by weight, or about 0.5% by weight.

1.53 Any foregoing composition, wherein the composition has less than 40% by weight of any silica (e.g., thickening silica and/or high cleaning silica), such as 5-40%, or 8-30%, or 8-25% or 15-25%, or 20-25%, or about 23% by weight.

1.54 Any foregoing composition, wherein the composition has the following formula:

| | % by weight |
|---|---|
| Water | Q.S. (~30) |
| Nonionic polymers (e.g., PEG) | 1-4 (e.g., 2) |
| Xanthan Gum | 0.1-0.8 (e.g., 0.4) |
| Charcoal (e.g., activated charcoal) | 0.006-0.008 (e.g., 0.0075) |
| Stannous Fluoride | 0.4-0.5 (e.g., 0.454) |
| Potassium Nitrate | 0.1-1.0 (e.g., 0.5) |
| TSPP | 0.2-2.0 (e.g., 1.2) |
| Humectants (e.g., sorbitol) | 35-60 (e.g., 47) |
| Silicas (e.g., hydrated silica, such as thickening or high cleaning) | 10-30 (e.g., 23) |
| Anionic surfactant (e.g., SLS) | 0.5-4 (e.g., 1.5) |
| Zwitterionic surfactant (e.g., betaine) | 0.5-3 (e.g., 1.25) |
| Hyaluronic acid or salt thereof | 0-0.5 (e.g., 0.01-0.05) |
| Flavors and Sweeteners | 0.5-5 (e.g., 1.8) |
| Titanium dioxide | 0 |
| Colors (e.g., dyes) | 0-0.03 (e.g., 0.001 to 0.01) |

1.55 Any foregoing composition, in the form of a gel having a maximum cross-sectional thickness of 1 to 25 mm, e.g., 5-20 mm, or 5-15 mm, or 5-10 mm, optionally wherein the cross-section is selected from a square, rectangular, star-shaped, cylindrical, oval, hexagonal, or flat ribbon cross-section.

1.56 Any foregoing composition, in the form of a gel having cylindrical cross section (e.g., diameter of 5-15 mm or 8-10 mm).

1.57 Any foregoing composition, in the form of a gel having a flat ribbon cross-section (e.g., with a thickness of 2-15 mm 5-10 mm).

1.58 Any foregoing composition, further comprising an additional stannous source, e.g., selected from stannous pyrophosphate, stannous phosphate, stannous sulfate, stannous nitrate, stannous carbonate, and stannous oxide, such as in an amount of 0.1-5% by weight of the composition (e.g., 0.1-3%. 0.1-2%, 0.1-1%).

1.59 Any foregoing composition, further comprising hyaluronic acid or a hyaluronic acid salt (e.g., sodium hyaluronate), e.g., such as in an amount of 0.001 to 0.5% by weight of the composition (e.g., 0.01 to 0.2%, or 0.01 to 0.1%, or 0.01 to 0.05%, by weight of the composition).

1.60 Any foregoing composition, further comprising a food coloring agent (e.g., a dye), such as, FD&C Blue No. 1, FD&C Blue No. 2, FD&C Green No. 3, FD&C Red No. 3, FD&C Red No. 40, FD&C Yellow No. 5, FD&C Yellow No. 6, or any combination thereof, optionally in an amount of each of 0.0001 to 0.03% by weight of the composition, e.g., 0.0001 to 0.015%, or 0.0001 to 0.01%, or 0.0001 to 0.005%, or 0.001 to 0.005%, by weight of the composition.

1.61 Composition 1.60, wherein the food coloring agent is FD&C Blue No. 1.

1.62 Any foregoing composition, wherein the composition has at least 50% transmittance of light at 400 to 700 nm wavelength when measured on a sample of the composition having a thickness of at least 1 mm and up to 10 mm, or up to 15 mm, or up to 20 mm, or up to 25 mm.

1.63 Any foregoing composition, wherein the composition has at least 70% transmittance of light at 400 to 700 nm wavelength when measured on a sample of the composition having a thickness of at least 1 mm and up to 5 mm, 6 mm, 7 mm, 8 mm, 9 mm. 10 mm, 12 mm, or 15 mm.

1.64 Any foregoing composition, wherein the composition has at least 80% transmittance of light at 400 to 700 nm wavelength when measured on a sample of the composition having a thickness of at least 1 mm and up to 3 mm, 4, mm, 5 mm. 6 mm, 7 mm. 8 mm, 9 mm. 10 mm, or 12 mm.

1.65 Any foregoing composition, wherein the composition has at least 90% transmittance of light at 400 to 700 nm wavelength when measured on a sample of the composition having a thickness of at least 1 mm and up to and up to 2 mm. 3 mm, 4 mm. 5 mm, 6 mm, 7 mm, or 8 mm.

1.66 Any foregoing composition, wherein a 5-mm thick sample of the composition has a light transmittance at 400 to 700 nm wavelength of 40-95%, e.g., 50-95%, or 60-95%, or 70-95%, or 75-95%, or 80-95%, or 85-95%, or 90-95%, or 40-90%, or 50-90%, or 60-90%, or 70-90%, or 75-90%, or 80-90%, or 85-90%, or 40-85%, or 50-85%, or 60-85%, or 70-85%, or 75-85%, or 80-85%, or 40-80%, or 50-80%, or 60-80%, or 70-80%, or 75-80%. 40-75%, or 50-75%, or 60-75%, or 70-75%, or 40-70%, or 45-70%, or 50-70%, or 55-70%, or 60-70%, or 65-70%.

1.67 Any foregoing composition, wherein a 10-mm thick sample of the composition has a light transmittance at 400 to 700 nm wavelength of 30-85%. e.g., 40-85%, 50-85%, or 60-85%, or 70-85%, or 75-85%, or 80-85%, or 30-80%, 40-80%, 50-80%, or 60-80%, or 65-80%, or 70-80%, or 75-80%, or 30-75%, or 40-75%, 50-75%, or 60-75%, or 65-75%, or 70-75%, or 30-70%, or 40-70%. 45-70%, or 50-70%, or 55-70%, or 60-70%, or 65-70%, or 30-65%, or 40-65%, or 45-65%. 50-65%, or 55-65%, or 60-65%, or 30-60%, or 35-65%, or 40-60%. 45-60%, or 50-60%, or 55-60%. 30-55%, or 35-55%, or 40-55%, 45-55%, or 50-55%.

1.68 Any foregoing composition, wherein a 15-mm thick sample of the composition has a light transmittance at 400 to 700 nm wavelength of 25-80%, e.g., 35-80%, 45-80%, 50-80%, or 55-80%, or 60-80%, or 65-80%, or 70-80%, or 75-80%, or 25-70%, or 30-70%, 35-70%, 40-70%, or 45-70%, or 50-70%, or 55-70%, or 60-70%, or 65-70%, or 25-60%, or 30-60%. 35-60%. 40-60%, or 45-60%, or 50-60%, or 55-60%, or 25-50%, or 30-50%, 35-50%, 40-50%, or 45-50%, or 25-45%, or 30-45%. 35-45%, 25-40%, or 30-40%, or 35-40%.

1.69 Any foregoing composition, wherein the composition has a light transmittance of at least 0.1% measured on a 10 mm vertical sample of 25 mm path length, e.g., at least 1%, or at least 10%, or at least 2%, or 5% to 10%, or 1% to 10%, or 20% to 50%, or about 25%.

Light transmittance is a property of transparent and translucent materials, and it is a measure of the material's capacity to transmit light all the way through themselves. Fully opaque materials have a light transmittance of zero because no light at all passed through the material. Light transmission occurs when light passes into a material and at least some measurable amount is able to pass out the other side. Thus, the light transmittance of an object or material is a measure of its effective transmission, given as a ratio of the total amount of light that is transmitted through compared to the total amount of light incident upon it, often expressed as a percentage. Generally speaking, an object or material having a light transmittance of 10% or less is considered nearly opaque to fully opaque, while an object or material having a light transmittance of 90% or more is considered nearly or fully translucent or transparent. Critically, light transmittance is dependent on the path length through the sample tested, that is, the thickness of the material or object. Many materials that are traditionally considered opaque can appear translucent if the thickness is small enough (e.g., 50-100 nm), and many materials that are traditionally considered translucent can appear opaque if the thickness is large enough. This is because few, if any, materials have an actual transmittance of either 0% or 100%. The transmittance (or translucency) of a material or object can be difficult to predict because it depends not only on the material's inherent ability to absorb light (e.g., particular wavelengths of light) but also on the material's ability to scatter incident light within the material. Both of these factors (absorption and scattering) can be influenced by each ingredient in a composition, as well as how the ingredients in the compositions are mixed (e.g., whether there are phase boundaries or suspended particles, and if so, particle sizes).

In a second aspect, the present disclosure further provides a method (Method 1) of formulating a black translucent dentifrice comprising the steps of (1) providing a dentifrice base, (2) adding charcoal (e.g., activated charcoal) in an amount of 0.001 to 0.025% by weight, and (3) adding any other desired oral care ingredients.

For example, the disclosure provides embodiments of Method 1 as follows:

1.1 Method 1, wherein 0.001 to 0.020% by weight of charcoal is added, e.g., 0.001 to 0.015%, or 0.001 to 0.012%, or 0.005 to 0.010%, or 0.005 to 0.009%, or 0.005 to 0.009% by weight of charcoal is added.

1.2 Method 1.1, wherein 0.006 to 0.008% by weight of charcoal is added.

1.3 Method 1.2, wherein 0.007 to 0.008% by weight of charcoal is added.

1.4 Method 1.3, wherein about 0.0075% by weight of charcoal is added.

1.5 Method 1 or any of 1.1-1.4, wherein charcoal is activated charcoal.

1.6 Any preceding method, wherein the method provides a dentifrice having a light transmittance of at least 0.001% measured on a 10 mm-thick vertical sample, e.g., at least 0.01%, or at least 0.1%, or at least 0.2%, or 0.1% to 1%, or 0.2% to 0.5%, or about 0.25%.

1.7 Any preceding method, wherein the method provides a dentifrice having a turbidity of less than 1000 NTU measured on a 10 mm thick sample, e.g., less than 750 NTU, or less than 600 NTU, or 300-700 NTU, or 400-600 NTU, or about 500 NTU.

1.8 Any preceding method, wherein the method provides a dentifrice having L*a*b color values of 1-50 for L (e.g., 10-20), and/or −0.5 to −0.15 for a, and/or −0.75 to 01.25 for b.

1.9 Method 1.8, wherein the method provides a dentifrice having L*a*b color values of about 14.7 for L, about −0.1 for a and about −1.0 for b.

1.10 Any preceding method, wherein the dentifrice does not comprise titanium dioxide.

1.11 Any preceding method, wherein the dentifrice is formed as a gel having a maximum cross-sectional thickness of 1 to 25 mm, e.g., 5-20 mm, or 5-15 mm, or 5-10 mm, optionally wherein the cross-section is selected from a square, rectangular, star-shaped, cylindrical, oval, hexagonal, or flat ribbon cross-section.

1.12 Any preceding method, wherein the dentifrice is formed as a gel having a cylindrical cross section (e.g., diameter of 5-15 mm or 8-10 mm).

1.13 Any preceding method, wherein the dentifrice is formed as a flat ribbon cross-section (e.g., with a thickness of 2-15 mm 5-10 mm).

1.14 Any preceding method, wherein the dentifrice has any one or more features as described for Compositions 1.1-1.68.

1.15 Any preceding method, wherein the method results in a composition according to Composition 1, or any of 1.1-1.68.

In a third aspect, the present disclosure provides an oral care package comprising a composition according to Composition 1, or any of composition formed by the Method 1, et seq, wherein the package comprises a container comprising a single storage compartment, which compartment contains the composition, and a closure (e.g., a screw-top closure) which seals the compartment. In some embodiments, the package comprises a closure which dispenses a ribbon of toothpaste or gel having a circular cross-section, oval cross-section, square, rectangular, hexagonal, star-shaped, or flat-ribbon cross-section. In some embodiments, such ribbon is dispensed having a diameter or thickness of 5-25 mm, e.g., 1-25 mm, 5-20 mm, 5-15 mm, 5-10 mm, or 10-15 mm, or 15-20 mm, or 20-25 mm.

In a fourth aspect, the present disclosure provides a method of treatment or prevention of gingivitis, plaque, dental caries, and/or dental hypersensitivity, the method comprising the application to the oral cavity of a person in need thereof, of a composition according to the invention (e.g., Composition 1 et seq.), e.g., by brushing, for example, one or more times per day.

Alternatively, the present disclosure provides Composition 1, et seq., for use in the treatment or prevention of gingivitis, plaque, dental caries, and/or dental hypersensitivity.

The methods of the fourth aspect comprise applying any of the compositions as described herein to the teeth, e.g., by brushing, or otherwise administering the compositions to the oral cavity of a subject in need thereof. The compositions can be administered regularly, such as, for example, one or more times per day (e.g., twice per day). In various embodiments, administering the compositions of the present disclosure to teeth may provide one or more of the following specific benefits: (i) reduce or inhibit formation of dental caries, (ii) reduce, repair or inhibit pre-carious lesions of the enamel, e.g., as detected by quantitative light-induced fluorescence (QLF) or electrical caries measurement (ECM), (iii) reduce or inhibit demineralization and promote remineralization of the teeth, (iv) reduce hypersensitivity of the teeth, (v) reduce or inhibit gingivitis, (vi) promote healing of sores or cuts in the mouth, (vii) reduce levels of acid producing and/or malodor producing bacteria, (viii) treat, relieve or reduce dry mouth, (ix) clean the teeth and oral cavity, (x) whiten the teeth, (xi) reduce tartar build-up, (xii) reduce or prevent oral malodor, and/or (xiii) promote systemic health, including cardiovascular health, e.g., by reducing potential for systemic infection via the oral tissues.

As used herein, an "oral care composition" refers to a composition for which the intended use includes oral care, oral hygiene, and/or oral appearance, or for which the intended method of use comprises administration to the oral cavity. The term "oral care composition" thus specifically excludes compositions which are highly toxic, unpalatable, or otherwise unsuitable for administration to the oral cavity. In some embodiments, an oral care composition is not intentionally swallowed, but is rather retained in the oral cavity for a time sufficient to affect the intended utility. The oral care compositions as disclosed herein may be used in nonhuman mammals such as companion animals (e.g., dogs and cats), as well as by humans. In some embodiments, the oral care compositions as disclosed herein are used by humans.

As used herein, "single component" means an oral care composition comprising at most a single compositional component at any time. Thus, this is in distinction to a "dual-component" composition, which is manufactured as two separate compositions, maintained separately until final point of use. For example, a dual component toothpaste is typically packaged in a tube containing two parallel compartments exiting via a common nozzle such that when the user extrudes the toothpaste from the package the two components mix immediately prior to application to the oral cavity. Dual component compositions are often used to maintain in separate components and compartments ingredients which are mutually incompatible, such that if kept in the same component they would adversely react or interfere with each other.

The skilled artisan will understand that transparency is dependent on thickness. Thus, even a transparent toothpaste will appear opaque if viewed through a thick enough sample. Translucent is generally understood as meaning non-opaque, e.g., that at least some light passes entirely through an object or material. For example, as used herein, "translucent" may refer to a composition having at least 20% light transmittance at a relevant thickness (e.g., 5 to 25 mm), or at least 30%, at least 40%, at least 50% or at least 60% transmittance, up through 100% transmittance.

As used herein, "anionic surfactant" means those surface-active or detergent compounds that contain an organic hydrophobic group containing generally 8 to 26 carbon atoms or generally 10 to 18 carbon atoms in their molecular structure and at least one water-solubilizing group selected from sulfonate, sulfate, and carboxylate so as to form a water-soluble detergent. Usually, the hydrophobic group will comprise a $C_8$-$C_{22}$ alkyl, or acyl group. Such surfactants are employed in the form of water-soluble salts and the salt-forming cation usually is selected from sodium, potassium, ammonium, magnesium and mono-, di- or tri-$C_2$-$C_3$ alkanolammonium, with the sodium, magnesium and ammonium cations again being the usual ones chosen. Some examples of suitable anionic surfactants include, but are not limited to, the sodium, potassium, ammonium, and ethanolammonium salts of linear $C_8$-$C_{18}$ alkyl ether sulfates, ether sulfates, and salts thereof. Suitable anionic ether sulfates have the formula $R(OC_2H_4)_n OSO_3M$ wherein n is 1 to 12, or 1 to 5, and R is an alkyl, alkylaryl, acyl, or alkenyl group having 8 to 18 carbon atoms, for example, an alkyl group of $C_{12}$-$C_{14}$ or $C_{12}$-$C_{16}$, and M is a solubilizing cation selected from sodium, potassium, ammonium, magnesium and mono-, di- and triethanol ammonium ions. Exemplary alkyl ether sulfates contain 12 to 15 carbon atoms in the alkyl groups thereof, e.g., sodium laureth (2 EO) sulfate. Some preferred exemplary anionic surfactants that may be used in the compositions of the present disclosure include sodium laurel ether sulfate (SLES), sodium lauryl sulfate, and ammonium lauryl sulfate. In certain embodiments, the anionic surfactant is present in an amount of 0.01 to 5.0%, 0.1 to 2.0%, 0.2 to 0.4%, or about 0.33%.

As used herein, "nonionic surfactant" generally refers to compounds produced by the condensation of alkylene oxide groups (hydrophilic in nature) with an organic hydrophobic compound which may be aliphatic or alkyl-aromatic in nature. Examples of suitable nonionic surfactants include poloxamers (sold under trade name PLURONIC®), polyoxyethylene, polyoxyethylene sorbitan esters (sold under trade name TWEENS®), Polyoxyl 40 hydrogenated castor oil, fatty alcohol ethoxylates, polyethylene oxide condensates of alkyl phenols, products derived from the condensation of ethylene oxide with the reaction product of propylene oxide and ethylene diamine, ethylene oxide condensates of aliphatic alcohols, alkyl polyglycosides (for example, fatty alcohol ethers of polyglycosides, such as fatty alcohol ethers of polyglucosides, e.g., decyl, lauryl, capryl, caprylyl, myristyl, stearyl and other ethers of glucose and polyglucoside polymers, including mixed ethers such as capryl/caprylyl ($C_{8-10}$) glucoside, coco ($C_{8-16}$) glucoside, and lauryl ($C_{12-16}$) glucoside), long chain tertiary amine oxides, long chain tertiary phosphine oxides, long chain dialkyl sulfoxides, and mixtures of such materials.

In some embodiments, the nonionic surfactant comprises amine oxides, fatty acid amides, ethoxylated fatty alcohols, block copolymers of polyethylene glycol and polypropylene glycol, glycerol alkyl esters, polyoxyethylene glycol octylphenol ethers, sorbitan alkyl esters, polyoxyethylene glycol sorbitan alkyl esters, and mixtures thereof. Examples of amine oxides include, but are not limited to, laurylamidopropyl dimethylamine oxide, myristylamidopropyl dimethylamine oxide, and mixtures thereof. Examples of fatty acid amides include, but are not limited to, cocomonoethanolamide, lauramide monoethanolamide, cocodiethanolamide, and mixtures thereof. In certain embodiments, the nonionic surfactant is a combination of an amine oxide and a fatty acid amide. In certain embodiments, the amine oxide is a mixture of laurylamidopropyl dimethylamine oxide and myristylamidopropyl dimethylamine oxide. In certain embodiments, the nonionic surfactant is a combination of lauryl/myristylamidopropyl dimethylamine oxide and cocomonoethanolamide. In certain embodiments, the nonionic surfactant is present in an amount of 0.01 to 5.0%, 0.1 to 2.0%, 0.1 to 0.6%, 0.2 to 0.4%, about 0.2%, or about 0.5%.

Humectants can enhance the viscosity, mouthfeel, and sweetness of the product, and may also help preserve the product from degradation or microbial contamination. Suitable humectants include edible polyhydric alcohols such as glycerin, sorbitol, xylitol, propylene glycol as well as other polyols and mixtures of these humectants. Sorbitol may in some cases be provided as a hydrogenated starch hydrolysate in syrup form, which comprises primarily sorbitol (the product if the starch were completely hydrolyzed to glucose, then hydrogenated), but due to incomplete hydrolysis and/or presence of saccharides other than glucose, may also include other sugar alcohols such mannitol, maltitol, and longer chain hydrogenated saccharides, and these other sugar alcohols also function as humectants in this case. Sorbitol is commonly supplied commercially as a mixture having about 30 wt % water (i.e., 70% aqueous sorbitol). As described here in reference to quantity, the water content of the sorbitol is excluded (for example, a formulation having 47 wt. % sorbitol can be made by using about 68% by weight of 70% aqueous sorbitol). In some embodiments, humectants are present at levels of 5% to 70%, e.g., 15% to 40% by weight.

Flavorings for use in the present invention may include extracts or oils from flavorful plants such as peppermint, spearmint, cinnamon, wintergreen, and combinations thereof, cooling agents such as menthol, methyl salicylate, and commercially available products such as OptaCool® from Symrise, as well as sweeteners, which may include polyols (which also function as humectants), saccharin, acesulfame, aspartame, neotame, stevia and sucralose.

Other ingredients which may optionally be included in compositions according to the present invention include other stannous salts (e.g., stannous phosphate or stannous pyrophosphate), hyaluronic acid, green tea, ginger, sea salt, coconut oil, turmeric, white turmeric (white curcumin), grape seed oil, ginseng, monk fruit, vitamin E, basil, chamomile, pomegranate, and aloe vera. Any of such ingredients may be present in an amount from 0.01% to 2% by weight of the composition, e.g., 0.01 to 1%, or 0.01 to 0.5%, or 0.01 to 0.1%. The use of additional stannous salts is particularly beneficial in helping to control oral malodor caused by oral bacteria. Without being bound by theory, it is believed that there could be a synergistic interaction between the charcoal and the stannous salts, especially stannous pyrophosphate, that would provide improved odor control compared to existing oral care compositions.

EXAMPLES

Unless otherwise noted, the pH of all solutions described in the Examples is about 7. Unless otherwise noted, all figures for stannous ion concentration refer to soluble stannous, not total stannous (total stannous being soluble and insoluble stannous combined).

Example 1—Stabilization of Stannous Fluoride in Aqueous Solution by Potassium Nitrate and Tetrasodium Pyrophosphate Simple solutions of 0.454% stannous fluoride in water combined with different stabilizing agents are compared using visual observation and assays for soluble stannous ion concentration. As a baseline, a solution of 0.454% stannous fluoride in water is compared to a solution of 0.454% stannous fluoride and 5.0% potassium nitrate. Both solutions have a pH of 7. The solutions are aged at room temperature for 30 days, and soluble stannous ion content is measured at 1 day, 5 days, 9 days, 15 days, and 26 days. Stannous ion (Sn(II)) concentration is determined by titration. 0.1N iodine solution is first added to a sample of the solution and stirred for at least one hour. The solution is observed to turn brown. 0.1N sodium thiosulfate solution is then added until the mixture turns and remains stably white. The amount of soluble stannous ion is then calculated as the difference between the molar amount of iodine added and the molar amount of sodium thiosulfate added, and this molar amount of soluble stannous ion is converted to a concentration figure. The concentration value so determined is then converted to a percentage of the theoretical amount of stannous (II) which should be present based on the formulation of the solution.

The results are shown in the table below, expressed as the percentage of soluble stannous compared to the theoretical amount:

|  | Day 1 | Day 5 | Day 9 | Day 15 | Day 26 |
| --- | --- | --- | --- | --- | --- |
| $SnF_2$ | 96% | 93% | 89% | 80% | 63% |
| $SnF_2$ + $KNO_3$ | 100% | 100% | 94% | 83% | 68% |

The results show that at neutral pH, potassium nitrate by itself improves stannous ion stability initially, but by day 9, stannous ion concentration continues to fall comparable to the unstabilized stannous fluoride solution. It is also observed that both solutions are initially turbid, and continued aging results in the solutions becoming yellow and remaining turbid. For comparison, a solution of $SnF_2$ at its native pH (acidic) is clear and colorless and remains so through aging. Thus, this demonstrates that a solution of stannous ion at near or above neutral pH is unstable, but that potassium nitrate provides short-lived stabilization.

In a second set of experiments, the stability of 0.454% stannous fluoride is compared in solutions which each comprise 0.3% potassium nitrate and optionally a second chelating agent. The second agent is selected from 0.77% tetrasodium pyrophosphate (TSPP), 2.2% sodium citrate, 1.0% sodium gluconate, and 0.5% arginine, and the resulting three-component solutions have a pH of 7 in each case. Each solution is clear, colorless and homogenous, except for the solution with arginine, which is initially turbid. 0.454% stannous fluoride in water is included as a negative control. As a positive control, one solution consists of 0.454% stannous fluoride and 0.3% potassium nitrate acidified to pH 3. As noted previously, it has been reported that at a pH below 6, potassium nitrate alone stabilizes stannous fluoride in solution, and that result is confirmed here. In this experiment, aging is conducted at 60° C. with stannous ion concentration measured at 0 days, 6 or 7 days and at 14 days. The results are shown in the table below, expressed as the percentage of soluble stannous compared to the theoretical amount:

|  | Day 0 | Day 6 | Day 7 | Day 14 |
| --- | --- | --- | --- | --- |
| $SnF_2$ + $KNO_3$ + TSPP | 100% | 96% |  | 87% |
| $SnF_2$ + $KNO_3$, pH 3 | 98% |  | 92% | 85% |
| $SnF_2$ + $KNO_3$ + citrate | 99% | 81% |  | 55% |
| $SnF_2$ + $KNO_3$, +gluconate | 100% | 47% |  | 44% |
| $SnF_2$ + $KNO_3$ + arginine | 100% | 29% |  | 17% |
| $SnF_2$ | 99% |  | 32% | 7% |

It is found that the stannous fluoride/potassium nitrate/TSPP solution remains homogenous at day 14, showing no signs of insoluble tin precipitation. The data demonstrates that absent a stabilizing agent, less than 10% of the original stannous ion remains available in solution after 14 days at 60° C. Potassium nitrate effectively stabilizes stannous ion under these conditions at a pH of 3, but not at neutral pH, as seen by comparing these results with the preceding results. Unexpectedly, however, the combination of potassium nitrate and TSPP at neutral pH stabilizes stannous as effectively as potassium nitrate alone at acidic pH. The same effect is not obtained using alternative chelating agents, such as citrate, gluconate and arginine. Thus, the particular combination of potassium nitrate and TSPP is shown to provide a synergistic stabilizing effect on stannous ion.

While potassium nitrate is found to stabilize stannous ion at acidic pH, it is also found that the solution undergoes an undesirable discoloration at the same time. This is most apparent after 4 weeks of aging at 60° C. While the stannous fluoride/potassium nitrate/TSPP solution remains homogenous and colorless after 4 weeks, the stannous fluoride/potassium nitrate/pH 3 solution becomes clearly yellow. This is confirmed by comparing UV/Vis spectroscopy, which shows a peak at about 300-310 nm wavelength in the acidic solution, which is not present in the neutral solution with TSPP.

In a third experiment, the effect of sodium tripolyphosphate (STPP) is compared to the effect of TSPP in stabilizing stannous over 2 weeks of aging at 60° C. It is found that STPP provides comparable benefits to TSPP, and these are both demonstrated as being synergistic effects resulting from the interaction of the potassium nitrate and the polyphosphate salt. The results are shown in the table below:

| Components (wt %) | | | | |
| --- | --- | --- | --- | --- |
| $SnF_2$ | $KNO_3$ | TSPP | STPP | % Stannous, Day 14 |
| 0.454 | 0 | 0 | 0 | 7.5% |
| 0.454 | 0.3 | 0 | 0 | 9.0% |
| 0.454 | 0 | 0.77 | 0 | 37% |
| 0.454 | 0 | 0 | 1.07 | 32% |
| 0.454 | 0.3 | 0.77 | 0 | 87% |
| 0.454 | 0.3 | 0 | 1.07 | 93% |

Example 2: Stability of Stannous
Fluoride/Potassium Nitrate/TSPP Mixture Over a
Range of Ratios A series of comparative solutions comprising stannous fluoride, potassium nitrate and TSPP are prepared and subjected to aging for 14 days at 60° C. On day 14, soluble stannous ion concentration is measured and visual observations are made. All solutions have 0.454% stannous fluoride, and the amounts of potassium nitrate and TSPP are adjusted to arrive at the desired molar ratios. The results are shown in the table below:

| Molar Ratio | | | |
| --- | --- | --- | --- |
| $SnF_2$ | $KNO_3$ | TSPP | % Stannous, Day 14 |
| 1 | 1 | 0 | 9% |
| 1 | 1 | 0.07 | 29% (turbid) |
| 1 | 1 | 0.1 | 25% (turbid) |
| 1 | 1 | 0.3 | 83% (turbid) |
| 1 | 1 | 0.7 | 83% (turbid) |
| 1 | 1 | 1 | 87% |
| 1 | 1 | 1.3 | 87% |
| 1 | 1 | 2 | 78% |
| 1 | 1 | 2.6 | 73% |
| 1 | 1 | 5.2 | 59% |
| 1 | 0 | 1 | 37% |
| 1 | 0.04 | 1 | 52% |
| 1 | 0.1 | 1 | 73% |
| 1 | 0.2 | 1 | 75% |
| 1 | 0.3 | 1 | 80% |
| 1 | 0.7 | 1 | 86% |
| 1 | 1 | 1 | 87% |
| 1 | 2 | 1 | 86% |
| 1 | 3.4 | 1 | 88% |
| 1 | 7 | 1 | 85% |
| 1 | 12 | 1 | 83% |
| 1 | 17 | 1 | 84% |
| 1 | 34 | 1 | 76% |

It is found that at a molar ratio of 1:1 stannous fluoride to potassium nitrate, a high level of stannous ion stability (>80%) and solution homogeneity can be obtained over a stannous fluoride to TSPP molar ratio of 1:1 to 1:2.5. When less TSPP is used, a precipitate forms even while maintaining acceptable stannous ion stability, while when the lowest or highest amounts of TSPP are employed, stannous ion stability drops.

It is further found that at a molar ratio of 1:1 stannous fluoride to TSPP, a high level of stannous ion stability (>80%) and solution homogeneity can be obtained over a wide range of stannous fluoride/potassium nitrate molar ratios.

Together these results further support the unique unexpected synergy between potassium nitrate and TSPP ins stabilizing stannous ion in aqueous solution.

Example 3—Stability of Stannous Fluoride/Potassium Nitrate/STPP Mixture Over a Range of Ratios To evaluate whether the same stabilization effect can be obtained using a tripolyphosphate salt, the same experimental procedure as outlined in Example 2 was repeated using sodium tripolyphosphate instead of tetrasodium pyrophosphate. The results are shown in the table below.

| Molar Ratio | | | |
|---|---|---|---|
| $SnF_2$ | $KNO_3$ | TSPP | % Stannous, Day 14 |
| 1 | 1 | 0 | 9% |
| 1 | 1 | 0.05 | 69% (turbid) |
| 1 | 1 | 0.1 | 84% (turbid) |
| 1 | 1 | 0.3 | 86% (turbid) |
| 1 | 1 | 0.5 | 90% (turbid) |
| 1 | 1 | 0.7 | 91% (turbid) |
| 1 | 1 | 1 | 92% |
| 1 | 1 | 1.5 | 92% |
| 1 | 1 | 2 | 87% |
| 1 | 1 | 3 | 87% |
| 1 | 1 | 4 | 83% |
| 1 | 1 | 6 | 82% |
| 1 | 1 | 8 | 79% |
| 1 | 1 | 10 | 79% |
| 1 | 0 | 1 | 32% |
| 1 | 0.03 | 1 | 74% |
| 1 | 0.1 | 1 | 84% |
| 1 | 0.2 | 1 | 86% |
| 1 | 0.3 | 1 | 91% |
| 1 | 1 | 1 | 93% |
| 1 | 2 | 1 | 95% |
| 1 | 3.4 | 1 | 96% |
| 1 | 7 | 1 | 95% |
| 1 | 17 | 1.5 | 92% |
| 1 | 34 | 1.5 | 86% |

As found with TSPP, the combination of STPP and potassium nitrate is found to result in stabilization of stannous over wide concentration ranges and ratios. It is further found that high stannous stability can be achieved using lower concentrations of STPP than for TSPP.

Example 4—Additional Studies on Stannous/Nitrate/Phosphate Systems

Additional studies are performed using the same 14-day, 60° C. accelerated aging study design, in which variations are made in the concentrations and/or components of the tested solutions.

In one experiment, the stabilizing effect of potassium nitrate and TSPP or STPP on stannous chloride is compared to the effect on stannous fluoride. As shown in the table below, it is found that STPP is somewhat more effective in stabilizing stannous chloride than TSPP is, although both polyphosphates provide effective stabilization of both stannous salts.

| Components (wt %) | | | | | |
|---|---|---|---|---|---|
| $SnF_2$ | $SnCl_2$ | $KNO_3$ | TSPP | STPP | % Stannous, Day 14 |
| 0.454 | 0 | 0.3 | 0.77 | 0 | 87% |
| 0 | 0.64 | 0.3 | 0.77 | 0 | 79% |
| 0.454 | 0 | 0.3 | 0 | 1.07 | 93% |
| 0 | 0.64 | 0.3 | 0 | 1.07 | 93% |

In another experiment, sodium nitrate or potassium chloride are compared to potassium nitrate in order to further evaluate the role of potassium nitrate in stabilizing stannous. The results are shown in the table below. It is found that sodium nitrate provides a comparable stabilizing affect as potassium nitrate, whereas potassium chloride does not provide an additive stabilizing effect. The stannous stability obtained in an $SnF_2$/KCl/TSPP or $SnF_2$/KCl/STPP system is comparable to the results obtained above for an $SnF_2$/TSPP or $SnF_2$/STPP system, as shown in Example 1 (32% stannous at day 14 using STPP, and 37% using TSPP). Thus, it is apparent that the nitrate anion provides a unique stabilizing effect which is not obtained using the isoelectronic and comparably sized chloride anion. Moreover, it is seen that the choice of cation to the nitrate anion makes a negligible difference to the outcome.

| Components (wt %) | | | | | | |
|---|---|---|---|---|---|---|
| $SnF_2$ | $KNO_3$ | $NaNO_3$ | KCl | TSPP | STPP | % Stannous, Day 14 |
| 0.454 | 0.3 | 0 | 0 | 0.77 | 0 | 87% |
| 0.454 | 0 | 0.25 | 0 | 0.77 | 0 | 86% |
| 0.454 | 0 | 0 | 0.23 | 0.77 | 0 | 34% |
| 0.454 | 0.6 | 0 | 0 | 0 | 1.6 | 96% |
| 0.454 | 0 | 0.5 | 0 | 0 | 1.6 | 94% |
| 0.454 | 0 | 0 | 0.46 | 0 | 1.6 | 40% |

In another experiment, the initial concentration of stannous fluoride is varied to determine the range over which the $KNO_3$/polyphosphate system provides a stabilizing effect. Two stabilizing systems are evaluated: $SnF_2$/$KNO_3$/TSPP at a 1:1:1 molar ratio, and $SnF_2$/$KNO_2$/STPP at a 1:2:1 molar ratio. The results are shown in the table below. It is unexpectedly found that the $KNO_3$/TSPP system provides highly effective stabilizing over an initial stannous fluoride concentration range of 0.1 to 1.7%, but this efficiency drops at lower initial stannous fluoride concentrations. In contrast, the $KNO_3$/STPP system provides effective stabilization over the entire stannous fluoride concentration range tested.

| Components (wt %) | | | | |
|---|---|---|---|---|
| $SnF_2$ | $KNO_3$ | TSPP | STPP | % Stannous, Day 14 |
| 0.05 | 0.03 | 0.077 | 0 | 2% |
| 0.09 | 0.06 | 0.16 | 0 | 52% |
| 0.15 | 0.1 | 0.27 | 0 | 73% |
| 0.20 | 0.13 | 0.36 | 0 | 80% |
| 0.45 | 0.3 | 0.77 | 0 | 87% |
| 1.0 | 0.66 | 1.7 | 0 | 91% |
| 2.0 | 1.3 | 4.4 | 0 | 90% |
| 2.5 | 1.7 | 5.6 | 0 | 91% |
| 0.05 | 0.06 | 0 | 0.11 | 77% |
| 0.07 | 0.09 | 0 | 0.18 | 86% |
| 0.09 | 0.12 | 0 | 0.22 | 91% |
| 0.15 | 0.19 | 0 | 0.37 | 92% |
| 0.45 | 0.6 | 0 | 1.1 | 95% |
| 1.0 | 1.3 | 0 | 2.4 | 91% |
| 1.7 | 2.2 | 0 | 6.0 | 86% |

In an additional experiment, the stannous chloride/potassium nitrate/TSPP (1:1 stannous to nitrate, 1:1 or 1:1.5 stannous to TSPP) and the stannous chloride/potassium nitrate/STPP (1:2 stannous to nitrate, 1:1, 1:1.5 or 1:3 stannous to STPP) systems are evaluated at a different pH values. In order to achieve an initially clear, homogenous solution, a higher concentration of the polyphosphate is required at higher pH values (pH 8 or 9). At pH 9, the STPP-based system (1:2:3 molar ratio) is initially slightly turbid, but it becomes clear prior to the end of the study. It is unexpectedly found that the STPP-based system provides improved stabilization over the somewhat broader pH range compared to the TSPP-based system. The results are shown in the table below:

| Components (wt %) | | | | | |
|---|---|---|---|---|---|
| $SnF_2$ | $KNO_3$ | TSPP | STPP | pH | % Stannous, Day 14 |
| 0.454 | 0.3 | 0.77 | 0 | 6 | 84% |
| 0.454 | 0.3 | 0.77 | 0 | 7 | 87% |
| 0.454 | 0.3 | 1.2 | 0 | 8 | 68% |
| 0.454 | 0.6 | 0 | 1.07 | 6 | 95% |
| 0.454 | 0.6 | 0 | 1.07 | 7 | 95% |
| 0.454 | 0.6 | 0 | 1.6 | 8 | 94% |
| 0.454 | 0.6 | 0 | 3.2 | 9 | 76% |

Example 5—Dentifrice Formulations

Exemplary dentifrice compositions according to the present disclosure may be formulated as follows (quantities shown in % by weight of the composition):

| | Example number | | |
|---|---|---|---|
| | A Gel | B Gel | C Gel |
| Stannous Ion Concentration (ppm) | 3400 | 3400 | 3400 |
| $SnF_2$:$KNO_3$:TSPP/STPP molar ratio | 1:1:1 | 1:10:1.4 | 1:10:1.7 |
| Water | Q.S. (~12) | Q.S. (~12) | Q.S. (~12) |
| Charcoal (e.g., activated charcoal) | 0.0075 | 0.0075 | 0.0075 |
| Microcrystalline cellulose (e.g., Avicel) | 0 | 0 | 0 |
| Polyethylene glycol (e.g., PEG 600) | 3 | 3 | 3 |
| Xanthan Gum | 0 | 0 | 0 |
| Carboxymethyl cellulose (e.g., Na CMC) | 0.65 | 0.8 | 0.8 |
| Stannous Fluoride | 0.454 | 0.454 | 0.454 |
| Potassium Nitrate | 0.3 | 3 | 3 |
| TSPP | 0.77 | 1.1 | |
| STPP | | | 1.8 |
| Glycerin | 0 | 0 | 0 |
| Sorbitol | 55 | 52 | 52 |
| Silicas | 22.75 | 22.75 | 22.75 |
| Anionic surfactant (e.g., SLS) | 1.5 | 1.5 | 1.5 |
| Zwitterionic surfactant (e.g., betaine) | 1.25 | 1.25 | 1.25 |
| Flavors, Colors, and other Minors | 1.75 | 1.75 | 1.75 |
| NaOH (50% Aqueous Solution)) | 0.06 | 0 | 0 |
| Hydrochloric acid | 0 | 0 | 0.05 |

Example 6—Transparency Determination

Without being bound by theory, it is believed that the presence of un-solubilized stannous ion in a high-water dentifrice may contribute significantly to opacity. It therefore believed that the solubilization of stannous ion according to the present disclosure (by interaction with nitrate and polyphosphate ions) removes this impediment to clarity and transparency. In combination with an appropriate amount of charcoal, a properly formulated dentifrice composition according to the present disclosure can achieve substantial improvements in clarity and transparency compared to prior art charcoal dentifrice compositions.

Additional exemplary translucent charcoal dentifrice compositions are shown in the table below.

| | D | E | F | G |
|---|---|---|---|---|
| Water | Q.S. (~30) | Q.S. (~30) | Q.S. (~27) | Q.S. (~30) |
| Charcoal (e.g., activated charcoal) | 0.0075 | 0.0075 | 0.0075 | 0.0075 |
| Nonionic polymers (e.g., PEG) | 2 | 3 | 2 | 2 |
| Xanthan Gum | 0 | 0 | 0 | 0.4 |
| Carboxymethyl cellulose | 0.52 | 0.48 | 0.52 | 0 |
| Stannous Fluoride | 0.454 | 0.454 | 0.454 | 0.454 |
| Potassium Nitrate | 0.5 | 1.2 | 0.5 | 0.5 |
| TSPP | 1.2 | 1.2 | 1.2 | 1.2 |
| Humectants (e.g., sorbitol) | 47 | 47 | 40 | 43 |
| Silicas | 16 | 16 | 23 | 23 |
| Anionic surfactant (e.g., SLS) | 1.5 | 1.5 | 1.5 | 1.5 |
| Zwitterionic surfactant (e.g., betaine) | 1.25 | 0 | 1.25 | 1.25 |
| Flavors and Sweeteners | 1.8 | 1.8 | 1.8 | 1.8 |

To evaluate the effect of charcoal concentration on transmittance and turbidity, the following compositions are prepared:

| | G-1 | G-2 | G-3 | G-4 | G-5 | G-6 |
|---|---|---|---|---|---|---|
| Water | Q.S. (~30) | Q.S. (~30) | Q.S. (~30) | Q.S. (~30) | Q.S. (~30) | Q.S. (~30) |
| Charcoal | 0.015 | 0.01125 | 0.009375 | 0.00825 | 0.0075 | 0.0075 |
| Titanium dioxide | 0 | 0 | 0 | 0 | 0 | 0.5 |
| PEG-12 | 2 | 2 | 2 | 2 | 2 | 2 |
| Xanthan Gum | 0.4 | 0.4 | 0.4 | 0.4 | 0.4 | 0.4 |
| Stannous Fluoride | 0.454 | 0.454 | 0.454 | 0.454 | 0.454 | 0.454 |
| Potassium Nitrate | 0.5 | 0.5 | 0.5 | 0.5 | 0.5 | 0.5 |
| TSPP | 1.2 | 1.2 | 1.2 | 1.2 | 1.2 | 1.2 |
| Sorbitol | 43 | 43 | 43 | 43 | 43 | 43 |

-continued

|                | G-1  | G-2  | G-3  | G-4  | G-5  | G-6  |
|----------------|------|------|------|------|------|------|
| Silicas        | 23   | 23   | 23   | 23   | 23   | 23   |
| SLS (sodium lauryl sulfate) | 1.5  | 1.5  | 1.5  | 1.5  | 1.5  | 1.5  |
| Betaine        | 1.25 | 1.25 | 1.25 | 1.25 | 1.25 | 1.25 |
| Flavors and Sweeteners | 1.8  | 1.8  | 1.8  | 1.8  | 1.8  | 1.8  |

Figure 1:
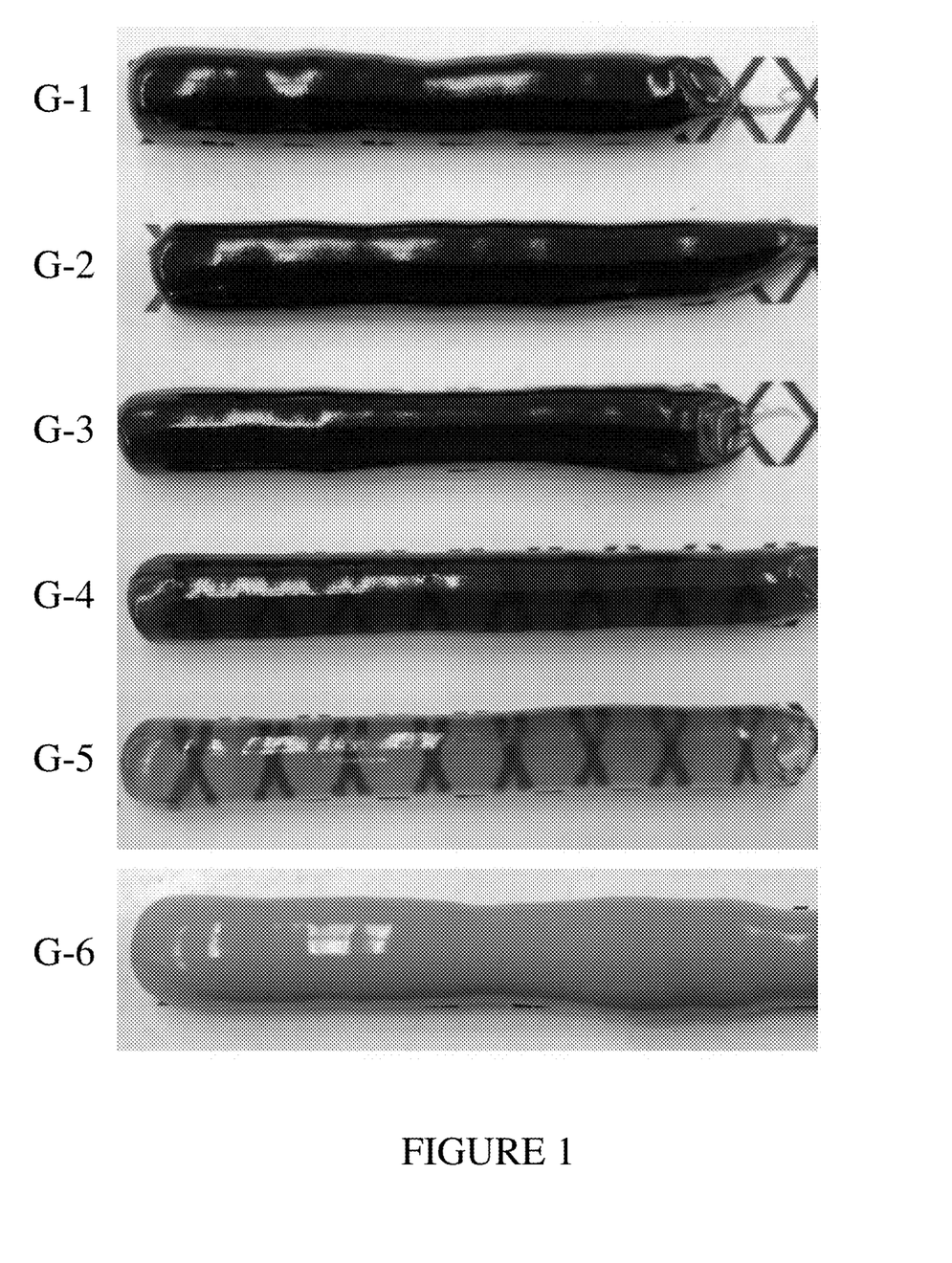
FIG. 1 shows photographs of exemplary dentifrice compositions placed on a white paper with black X's marked in permanent marker to demonstrate opacity or translucency of the compositions.

Photographs of the 8-9 mm diameter cylindrical nurdles of the above formulations placed on a white paper with black X's marked in permanent marker is shown in FIG. 1. It is apparent that formulas G-1 through G-4 provide substantially opaque nurdles, while formula G-5 provides a translucent and clearly black tinted nurdle. In comparison, formula G-6, which adds titanium dioxide, results in a grey opaque nurdle.

An additional set of dentifrice nurdles is prepared using compositions as follows:

|                         | G-7      | G-8      | G-9      | G-10     | G-5      |
|-------------------------|----------|----------|----------|----------|----------|
| Water                   | Q.S. (~30) | Q.S. (~30) | Q.S. (~30) | Q.S. (~30) | Q.S. (~30) |
| Charcoal                | 0.0095   | 0.0090   | 0.0085   | 0.0080   | 0.0075   |
| Titanium dioxide        | 0        | 0        | 0        | 0        | 0        |
| PEG-12                  | 2        | 2        | 2        | 2        | 2        |
| Xanthan Gum             | 0.4      | 0.4      | 0.4      | 0.4      | 0.4      |
| Stannous Fluoride       | 0.454    | 0.454    | 0.454    | 0.454    | 0.454    |
| Potassium Nitrate       | 0.5      | 0.5      | 0.5      | 0.5      | 0.5      |
| TSPP                    | 1.2      | 1.2      | 1.2      | 1.2      | 1.2      |
| Sorbitol                | 43       | 43       | 43       | 43       | 43       |
| Silicas                 | 23       | 23       | 23       | 23       | 23       |
| SLS (sodium lauryl sulfate) | 1.5  | 1.5      | 1.5      | 1.5      | 1.5      |
| Betaine                 | 1.25     | 1.25     | 1.25     | 1.25     | 1.25     |
| Flavors and Sweeteners  | 1.8      | 1.8      | 1.8      | 1.8      | 1.8      |

Figure 2:
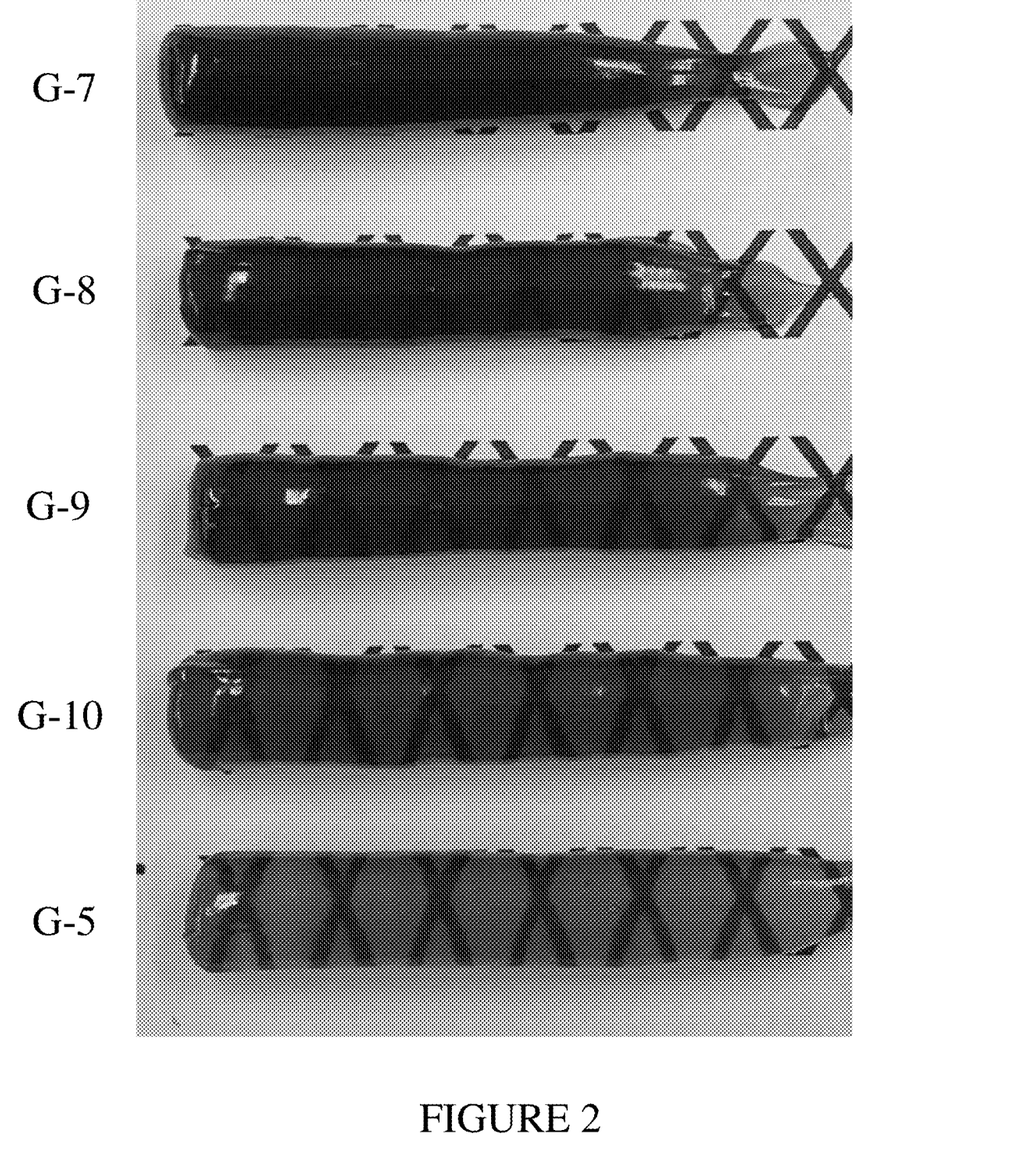
FIG. 2 shows photographs of additional exemplary dentifrice compositions placed on a white paper with black X's marked in permanent marker to demonstrate opacity or translucency of the compositions.

Photographs of the 8-9 mm diameter cylindrical nurdles of the above formulations placed on a white paper with black X's marked in permanent marker is shown in FIG. 2. It is apparent that formulas G-7 and G-8 provide substantially opaque nurdles, formula G-9 provides a slightly translucent nurdle, while only formulas G-10 and G-5 provide a translucent and clearly black tinted nurdle.

Turbidity for the dentifrices G-5 to G-10 are tested on a Hach-2100Q portable turbidimeter. Turbidity is expressed on a scale from 0 to 1000 NTU, wherein 0 represents complete optical clarity. Transmittance for the dentifrices is tested on a Turbiscan LAB stability analyzer as percent of light transmitted (100% is optical clarity) through a 10 mm vertical sample. It is noted that both turbidity and transmittance are dependent on the path length through the sample tested (turbidity and transmittance being linearly proportional to path length for homogenous samples). While the dentifrice squeezed out of a toothpaste tube forms a ribbon having a thickness of 7-10 mm, the instruments used require filling a sample cube having a 24.8 mm path length with the tested composition. As a result, values obtained for transmittance and turbidity are depressed compared to the values that would be achieved in practice (i.e., sample G-10 has a highly translucent appearance as 8-9 mm thick nurdles). The data results are shown in the table below.

|                      | G-7    | G-8    | G-9    | G-10   | G-5    |
|----------------------|--------|--------|--------|--------|--------|
| Charcoal (wt. %)     | 0.0095 | 0.0090 | 0.0085 | 0.0080 | 0.0075 |
| Turbidity (0-1000 NTU) |      |        |        |        | 554    |
| Transmittance (%)    | 0      | 0      | 0.61   | 2.91   | 25.2   |

The results show that the formulas G-9 has slight transparency, G-10 has a moderate level of transparency, and formula G-5 has a high level of clarity and transparency, at the path length measured, consistent with the photographic results. In contrast, the formulas of Example G-7, G-8 and G-9 have substantially zero clarity and transparency.

The color character of the compositions is tested to confirm that the color is black. Color can be measured by colorimetry, using any suitable instrument such as a Minolta Chromameter, e.g., model CR-400 (Minolta Corp., Ramsey, N.J.). The instrument can be programmed, for example, to measure $L^*a^*b^*$ values according to the standard established by the International Committee of Illumination (CIE). The $L^*a^*b^*$ system provides a numerical representation of three-dimensional color space where $L^*$ represents a lightness axis, $a^*$ represents a red-green axis and $b^*$ represents a yellow-blue axis. $L^*$ values range from 0 to 100, and an $L^*$ value of 0 is completely black while an $L^*$ value of 100 is completely white. The $a^*$ and $b^*$ values each range from $-50$ to $+50$. Values close to zero indicate no significant contribution from these colors, and are consistent with colors along the white-grey-black range. Test results are shown in the table below.

|                  | G-7    | G-8    | G-9    | G-10   | G-5    |
|------------------|--------|--------|--------|--------|--------|
| Charcoal (wt. %) | 0.0095 | 0.0090 | 0.0085 | 0.0080 | 0.0075 |
| $L^*$            | 11.8   | 9.4    | 19.17  | 6.48   | 12.01  |
| $a^*$            | 0.05   | 0.08   | -0.06  | -0.09  | 0.00   |
| $b^*$            | -0.06  | 0.21   | -0.78  | -0.21  | 0.18   |

These results show that all five nurdles are black in color with essentially no contribution from red-green or yellow-blue axis colors.

The results demonstrate that the dentifrices according to the invention are both black and translucent. Specifically, the data demonstrates that for cylindrical nurdles of 8-9 mm diameter, dentifrices according to the invention having from 0.005 to 0.009% charcoal are black and translucent. It will be appreciated that nurdles of different cross-section (e.g., flat ribbons, rectangular, oval, etc.) or nurdles of different thickness (e.g., less than 8 mm maximum thickness) will achieve black color and translucency at higher concentrations of charcoal (e.g., up to 0.025% charcoal). Analogously, it will be appreciated that nurdles of different cross-section or different thickness (e.g., more than 8 mm diameter) may maintain translucency and black color at lower charcoal concentrations (e.g., down to 0.001%).

Example 6—Variable Thickness Transparency Determination

Figure 3A:
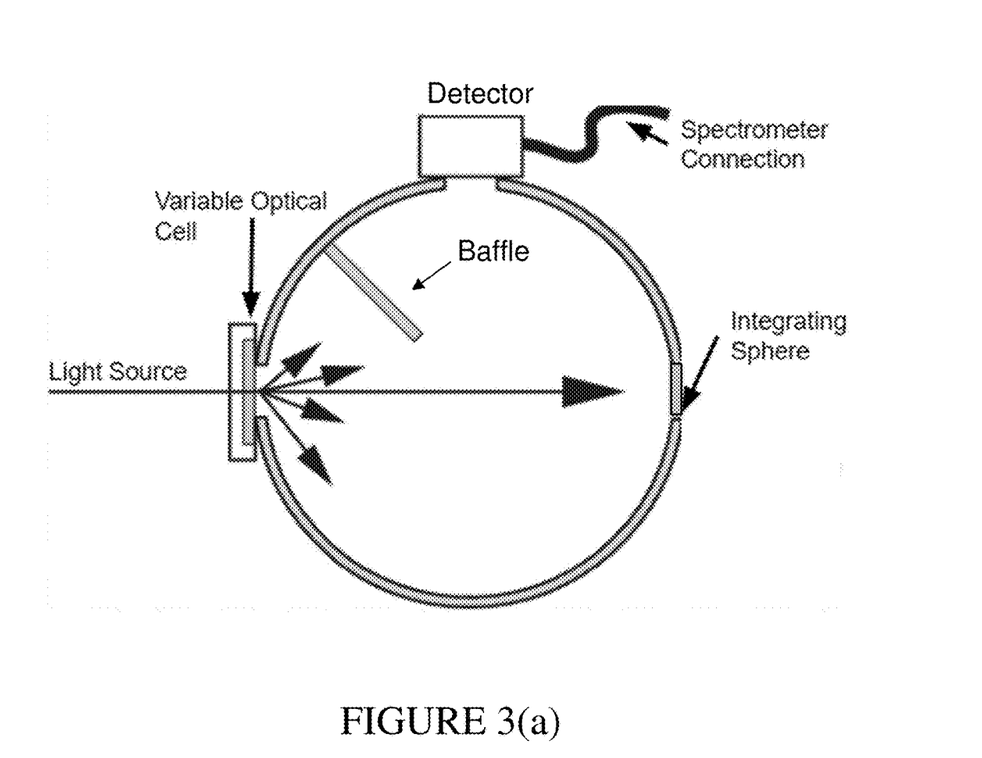
FIGS. 3(a) and 3(b) show schematic diagrams of a device for measuring the transmittance of a variable length (thickness) of a gel dentifrice.
Figure 3B:
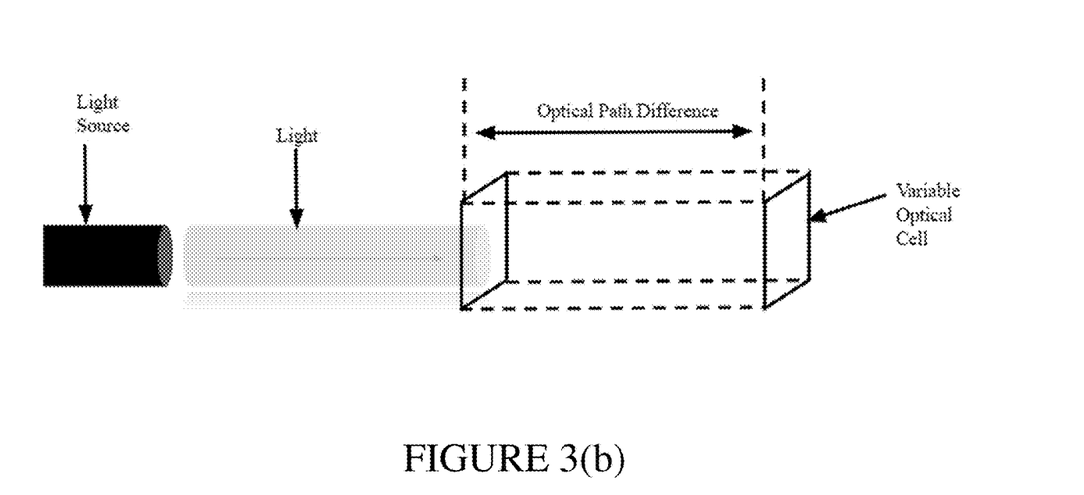

A device is constructed for determining transmittance of light through a dentifrice sample of variable thickness. A schematic of the device and the variable optical cell used in the device is illustrated in FIG. 3(a) and 3(b). As shown in FIG. 3(a), the device uses an integrating sphere with an incident light inlet placed at approximately a 90-degree angle to the outlet for the detector. A baffle is positioned between the inlet and the outlet in order to block direct impingement of light from the inlet to the outlet. All light collected at the detector is reflected light from throughout the interior of the integrating sphere. All interior surfaces of the integrating sphere are coated with a reflective material. The reflective material has a reflectance of 95-100% across 250 to 2500 nm wavelength. The use of the integrating sphere allows the light to homogeneously integrate in all directions as a result of the internal reflection inside the integrating sphere, and this provides more accurate and consistent measurements of transmittance.

Light entering the integration sphere passes through a variable-length optical cell which contains the dentifrice sample. As shown in FIG. 3(b), the variable-length optical cell comprises a broadband light source (400 to 700 nm) placed in line with the long-side of the sample cell. The optical path length of the cell can be changed to allow the light to travel through a shorter or longer thickness of dentifrice before entering the integrating sphere. The broad band light source is a halogen lamp with fiber optics and a collimator, which allows the light to directly pass through the toothpaste sample and into the integrating sphere. The attached spectrometer measures the transmission of the light through the dentifrice sample, providing a plot of intensity (transmittance) versus wavelength.

Testing of samples of dentifrice according to the present invention will demonstrate that they have high transmittance (>50%) at path lengths relevant to dentifrice compositions, e.g., 5 to 15 mm.

What is claimed:

1. A black translucent single-component oral care composition comprising:
    (i) from 0.1 to 2 wt. % of stannous fluoride or stannous chloride;
    (ii) from 0.1 to 5 wt. % of nitric acid or a water-soluble nitrate salt;
    (iii) from 0.1 to 5 wt. % of a water-soluble alkali metal polyphosphate comprising tetrasodium pyrophosphate and/or sodium tripolyphosphate;
    (iv) more than 10 wt. % of water; and
    (v) 0.001 to 0.0080.01 wt. % of charcoal,
    wherein all weight percentages are based on the total weight of the black translucent single-component oral care composition,
    wherein the composition has a molar ratio of the stannous fluoride or the stannous chloride to the nitric acid or the water-soluble nitrate salt to the tetrasodium pyrophosphate and/or the sodium tripolyphosphate of 1:1:1 to 1:10:1.7, and
    wherein the composition is formulated as a dentifrice and has a pH of 5 to 9, and wherein the composition has L*a*b color values of 1-50 for L, and/or −0.1 to 0.1 for a, and/or −0.25 to 0.25 for b, and wherein the oral care composition has a turbidity of less than 1000 NTU, as measured on a 10 mm thick sample.

2. The oral care composition of claim 1, wherein the charcoal is present in an amount of 0.005 to 0.0075 wt. %.

3. The oral care composition of claim 1, wherein the oral care composition does not comprise any white pigment.

4. The oral care composition of claim 1, wherein the water-soluble nitrate salt is selected from an alkali earth metal nitrate, alkaline earth metal nitrate, zinc nitrate, silver nitrate, ammonium nitrate, and a combination thereof.

5. The oral care composition of claim 1, wherein the water-soluble nitrate salt is selected from lithium nitrate, sodium nitrate, potassium nitrate, magnesium nitrate, calcium nitrate, and a combination thereof.

6. The oral care composition of claim 1, wherein the water-soluble nitrate salt is potassium nitrate.

7. The oral care composition of claim 1, wherein the water-soluble alkali metal polyphosphate is selected from a pyrophosphate, tripolyphosphate, tetraphosphate, hexametaphosphate, and a combination thereof.

8. The oral care composition of claim 7, wherein the water-soluble alkali metal polyphosphate is selected from sodium pyrophosphate, potassium pyrophosphate, sodium tripolyphosphate, potassium tripolyphosphate, and a combination thereof.

9. The oral care composition of claim 1, wherein the water-soluble nitrate salt is potassium nitrate and the water-soluble alkali metal polyphosphate salt is tetrasodium pyrophosphate.

10. The oral care composition of claim 1, wherein the oral care composition comprises a molar ratio of alkali metal polyphosphate to stannous fluoride or stannous chloride of at least 1:1.

11. The oral care composition of claim 1, wherein the oral care composition comprises a molar ratio of the nitric acid or the water-soluble nitrate salt to the stannous fluoride or the stannous chloride of at least 0.3:1.

12. The oral care composition of claim 1, wherein the water is present in an amount of at least 15 wt. %.

13. The oral care composition of claim 1, wherein the water is present in an amount of 10 to 50 wt. %.

14. An oral care package comprising the oral care composition according to claim 1, wherein the package comprises a container comprising a single storage compartment, which compartment contains the oral care composition, and a closure which seals the compartment.

15. A method of treatment or prevention of gingivitis, plaque, dental caries, and/or dental hypersensitivity, the method comprising the application to the oral cavity of a person in need thereof, of the oral care composition according to claim 1.

16. A black translucent single-component oral care composition comprising:
    (i) from 0.1 to 2 wt. % of stannous fluoride or stannous chloride;
    (ii) from 0.1 to 5 wt. % of nitric acid or a water-soluble nitrate salt;
    (iii) from 0.1 to 5 wt. % of a water-soluble alkali metal polyphosphate;
    (iv) more than 10 wt. % water; and
    (v) an amount up to about 0.008 wt. % of charcoal,
    wherein all weight percentages are based on the total weight of the oral care composition,
    wherein the oral care composition has a molar ratio of the stannous fluoride or the stannous chloride to the nitric acid or the water-soluble nitrate salt to the tetrasodium pyrophosphate and/or the sodium tripolyphosphate of 1:1:1 to 1:10:1.7, and wherein the oral care composition is formulated as a dentifrice and has a pH of 5 to 9, wherein the oral care composition is formulated as a dentifrice and has a pH of 5 to 9, and wherein the oral care composition has L*a*b color values of 1-50 for L, and/or −0.1 to 0.1 for a, and/or −0.25 to 0.25 for b, wherein the oral care composition has a turbidity of less than 1000 NTU measured on a 10 mm thick sample.

17. The black translucent single-component oral care composition according to claim 16, wherein the water-soluble alkali metal polyphosphate comprises sodium pyrophosphate, potassium pyrophosphate, sodium tripolyphosphate, potassium tripolyphosphate, or a combination thereof.

18. The black translucent single-component oral care composition according to claim 16, wherein the water-soluble alkali metal polyphosphate comprises sodium pyrophosphate, sodium tripolyphosphate, or a combination thereof.

19. The black translucent single-component oral care composition according to claim 16, wherein the water is present in an amount of at least 15 wt. %.

\* \* \* \* \*